United States Patent [19]
Imakoshi et al.

[11] Patent Number: 4,729,048
[45] Date of Patent: Mar. 1, 1988

[54] MAGNETIC TRANSDUCER COMBINATION WITH FORMATTING, DATA, AND SERVO HEADS

[75] Inventors: Shigeyoshi Imakoshi; Hideo Suyama; Hiroaki Yada, all of Kanagawa; Toru Katakura, Miyagi; Tetsuo Sekiya, Kanagawa; Masayuki Nakayama, Tokyo, all of Japan

[73] Assignee: Sony Corporation, Tokyo, Japan

[21] Appl. No.: 837,810

[22] Filed: Mar. 10, 1986

[30] Foreign Application Priority Data

| Mar. 8, 1985 | [JP] | Japan | 60-45985 |
| Apr. 24, 1985 | [JP] | Japan | 60-87758 |
| Apr. 24, 1985 | [JP] | Japan | 60-87757 |
| Dec. 16, 1985 | [JP] | Japan | 60-282325 |

[51] Int. Cl.$^4$ ............ G11B 5/596; G11B 5/012
[52] U.S. Cl. ............ 360/103; 360/77; 360/104; 360/121
[58] Field of Search ............ 360/77, 78, 102, 103, 360/27, 55, 61-64, 121, 104

[56] References Cited

U.S. PATENT DOCUMENTS

| 4,068,268 | 1/1978 | Idemoto et al. | 360/78 |
| 4,152,736 | 5/1979 | Jansen et al. | 360/78 |
| 4,613,915 | 9/1986 | Crouse et al. | 360/77 |

FOREIGN PATENT DOCUMENTS 53-138314  12/1978  Japan ............ 360/77

OTHER PUBLICATIONS

IBM TDB, vol. 16, No. 6, Comstock et al., 11/73, pp. 1821–1823.
IBM TDB, vol. 15, No. 4, Zimmermann et al., 9/72, pp. 1320–1321.
IBM TDB, vol. 25, No. 2, Schwarz, 7/82, pp. 778–779.
IBM TDB, vol. 22, No. 8A, Brock et al., 1/80, pp. 3127–3130.

Primary Examiner—Raymond F. Cardillo
Assistant Examiner—Steven R. Garland
Attorney, Agent, or Firm—Hill, Van Santen, Steadman & Simpson

[57] ABSTRACT

A combination magnetic transducer head apparatus which can easily achieve initial formatting of data tracks of a rotating magnetic recording medium such as a hard disk without using a specific separate initial formatting system. The apparatus comprises a magnetic head for initial formatting, another magnetic head for servo control and a magnetic recording and playback head all mounted on a head slider. In the apparatus, at least one track is first recorded on a magnetic disk by the magnetic head for initial formatting and then another track is recorded by the magnetic recording and playback head while the first track is scanned by the magnetic head for servo control whereafter such a series of operations are repeated until completion of recording of all tracks required.

2 Claims, 13 Drawing Figures

MAGNETIC TRANSDUCER COMBINATION WITH FORMATTING, DATA, AND SERVO HEADS

BACKGROUND OF THE INVENTION

This invention relates to a magnetic head apparatus which is used to record and reproduce signals to and from a rotating magnetic recording medium such as a magnetic disk, and more particularly to a combination magnetic transducer head apparatus which can easily achieve initial formatting of data tracks.

When data signals are to be recorded to or reproduced from a rotating magnetic recording medium such as, for example, a hard disk, it is necessary, particularly upon recording, to form tracks of a regular pitch on the rotating magnetic recording medium. Accordingly, in a conventional apparatus wherein a large number of hard disks are arranged for rotation in an integral relationship, tracking signals are prerecorded in an equal pitch on one of the hard disks so that while the tracking signals are referred to, positions in radial directions of magnetic heads for recording data signals to the other hard disks are controlled to record data signals to any of the hard disks. Such an apparatus has no problems where a large number of hard disks are rotated in an integral relationship, but where data signals are recorded to or reproduced from one or two hard disks, it is not suitable from a point of view of space and cost because it requires an additional hard disk for tracking signals.

Also, in order to record data signals on each hard disk so as to form tracks which have regularly arranged pitches, an apparatus is proposed which records position signals in the form of dots at positions in a radial direction at which individual tracks are to be formed. Since the apparatus only records position signals in the form of dots at positions in a radial direction at which individual tracks are to be formed, it is difficult to record regularly pitched tracks over an entire circumference of a hard disk.

However, in such conventional apparatus, a specific initial formatting system is required, which leads to a drawback that factory equipment become expensive.

Besides, if a magnetic disk is initialized on an initial formatting system other than a magnetic disk device, it may yield an eccentric motion relative to a spindle when it is mounted as a product on a magnetic disk system. This may cause a deterioration in accuracy of a positioning servo mechanism.

OBJECTS AND SUMMARY OF THE INVENTION

It is an object of the present invention to provide a novel combination magnetic transducer head apparatus suitable for use with a magnetic disk.

It is another object of the invention to provide a combination magnetic transducer head apparatus which can easily achieve initial formatting of data tracks of a magnetic disk.

It is a further object of the invention to provide a combination magnetic transducer head apparatus having a recording head for initial formatting of data tracks of a magnetic disk.

It is a still further object of the invention to provide a combination magnetic transducer head apparatus which can precisely achieve initial formatting of data tracks of and tracking servo control for a magnetic disk.

According to one aspect of the present invention, there is provided a combination magnetic transducer head apparatus, comprising a slider; a magnetic recording head formed on said slider for writing reference signal tracks on a rotating magnetic recording medium; the reference signal tracks having a predetermined track pitch P and a predetermined track width W; a servo control magnetic head formed on said slider; and a magnetic recording and playback head formed on said slider for recording and playback of signals on the magnetic recording medium; said servo control magnetic head and said magnetic recording and playback head being provided on said slider with such a positional relation that said magnetic recording and playback head records a signal track adjacent one of said reference signal tracks with the predetermined pitch on detecting the reference signal track using said servo control magnetic head.

According to another aspect of the invention, there is provided a combination magnetic transducer head apparatus, comprising a slider disposed in an opposing relationship to a rotating magnetic recording medium and mounted for movement in a radial direction of the rotating magnetic recording medium; and a data signal recording and playback magnetic head mounted on said slider, a pair of tracking signal playback magnetic heads mounted on said slider and having a same trace width, and an initial tracking signal recording magnetic head mounted on said slider and having a plurality of head sections; whereby, where the pitch of tracks to be formed on the rotating magnetic recording medium is P, the pitch of said plurality of head sections of said initial tracking signal recording magnetic head in a direction of the arrangement of the tracks is selected to be equal to the pitch P of the tracks while the distance in the direction of the arrangement of the tracks between the center of the trace width of said data signal recording and playback magnetic head and the center between the traces of said pair of tracking signal playback magnetic heads is selected to be nP (where n=2, 3, ...), and the number of said head sections of said initial tracking signal recording magnetic head is selected to be n.

According to a further aspect of the invention, there is provided a combination magnetic transducer head apparatus, comprising a slider disposed in an opposing relationship to a rotating magnetic recording medium and mounted for movement in a radial direction of the rotating magnetic recording medium; and a data signal recording and playback magnetic head mounted on said slider, a pair of tracking signal playback magnetic head mounted on said slider and having a same trace width, and an initial tracking signal recording magnetic head mounted on said slider and having a plurality of head sections; whereby, where the pitch of tracks to be formed on the rotating magnetic recording medium is P, the pitch of said plurality of head sections of said initial tracking signal recording magnetic head in a direction of the arrangement of the tracks is selected to be equal to the pitch P of the tracks while the distance in the direction of the arrangement of the tracks between the center of the trace width of said data signal recording and playback magnetic head and the center between the traces of said pair of tracking signal playback magnetic heads is selected to be $(n+\frac{1}{2})P$ (where n=1, 2, 3, ...), and the number of said head selections of said initial tracking signal recording magnetic head is selected to be n+1.

According to a still further object of the invention, there is provided a combination magnetic transducer head apparatus, comprising a slider disposed in an opposing relationship to a rotating magnetic recording medium and mounted for movement in a radial direction of the rotating magnetic recording medium; and a data signal recording and playback magnetic head mounted on said slider, a pair of tracking signal playback magnetic head mounted on said slider and having a same trace width, and an initial tracking signal recording magnetic head mounted on said slider and having three or more head sections; whereby, where the pitch of tracks to be formed on the rotating magnetic recording medium is P, the pitch of said plurality of head sections of said initial tracking signal recording magnetic head in a direction of the arrangement of the tracks is selected to be equal to twice of the pitch P of the tracks while the distance in the direction of the arrangement of the tracks between the center of the trace width of said data signal recording and playback magnetic head and the center between the traces of said pair of tracking signal playback magnetic heads is selected to be 3P.

DESCRIPTION OF THE PREFERRED EMBODIMENTS

Figure 1:
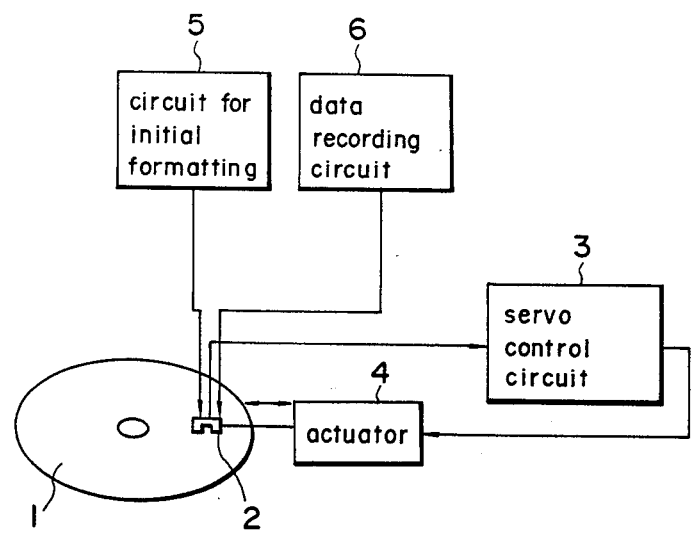
FIG. 1 is a diagrammatic representation illustrating general construction of a magnetic disk system to which a combination magnetic transducer head apparatus according to the present invention is applied.

A magnetic disk system for picking up an envelope of signals from a data track to effect servo control according to the present invention includes a magnetic head 7 for initial formatting, another magnetic head 8 for servo control and a magnetic recording and playback head 9 all mounted on a head slider 2. In the magnetic disk system, at least one track is first recorded on a magnetic disk 1 by the magnetic head 7 for initial formatting and then another track is recorded by the magnetic recording and playback head 8 while the first track is scanned by the magnetic head 8 for servo control whereafter such a series of operations are repeated until completion of recording of all tracks required.

Referring to FIG. 1 which illustrates general construction of the embodiment of the invention, the magnetic disk system includes a head slider 2 mounted for movement in a radial direction over a magnetic disk 1. The head slider 2 has mounted thereon three different magnetic heads including a magnetic head for initial formatting, another magnetic head for servo control and a magnetic recording and playback head as hereinafter described. The magnetic disk system further includes a servo control circuit 3 and an actuator 4 which constitute, together with the magnetic head for servo control on the head slider 2, a head positioning mechanism for controlling the position of the head slider 2.

The magnetic disk system further includes an initial formatting circuit 5 for driving the magnetic head for initial formatting on the head slider 2. Certain recording signals are supplied from the initial formatting circuit 5 to the magnetic head for initial formatting. Such recording signals may be a continuous square wave or some other data having some meanings. The magnetic disk system further includes a data recording circuit 6 for driving the magnetic recording and playback head on the head slider 2. The magnetic recording and playback head is naturally used for recording of data, but in the present embodiment, it is also used for initial formatting.

Figure 2:
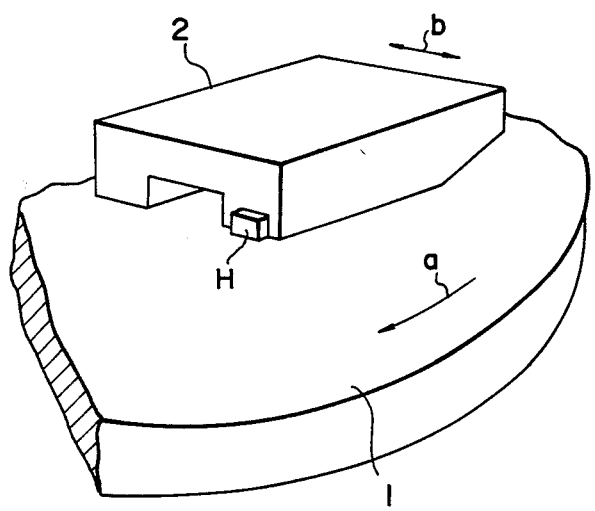
FIG. 2 is a schematic illustration showing a relation between a slider having thereon a combination magnetic transducer head apparatus according to the invention and a magnetic disk.

Referring now to FIG. 2 which illustrates, in an enlarged scale, a relation between the magnetic disk 1 and the head slider 2, the magnetic disk 1 is rotated in a direction as indicated by an arrow mark a, and the head slider 2 is moved in a radial direction of the magnetic disk 1 as indicated by an arrow mark b by the actuator 4. A combination magnetic transducer head including the magnetic head for initial formatting, the magnetic head for servo control and the magnetic data recording and playback head is mounted at an end of the head slider on the trailing edge relative to the recording medium 1.

Figure 3:
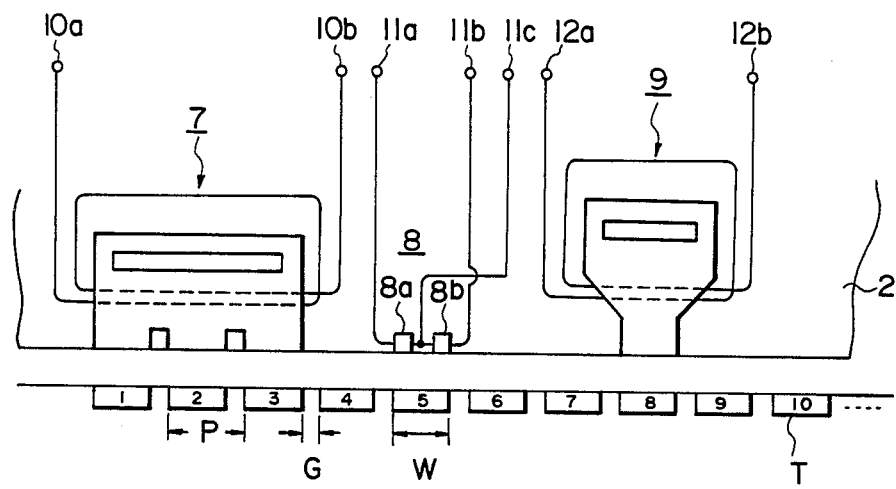
FIG. 3 is a diagrammatic representation showing structure of several heads on a head slider and relations of the heads to data tracks on a face of a disk.

Referring now to FIG. 3 which illustrates structure of the individual magnetic heads on the head slider 2 and the relationship of the heads to the data tracks on a face of the magnetic disk 1. The magnetic head for initial formatting is designated at 7 and is of the electromagnetic induction type which can record a plurality of, for example, three, tracks at a time. The magnetic head for servo control is designated 8 and includes a pair of magnetic heads 8a and 8b which may be each constituted from, for example, a head of the magnetoresistance effect type (an MR head). The magnetic data recording and playback head is designated 9.

The magnetic head 7 for initial formatting has a pair of terminals 10a and 10b and is connected to the initial formatting circuit 5 (FIG. 1). The magnetic head 8 for servo control has three output terminals 11a, 11b and 11c. The terminal 11c is grounded while the other output terminals 11a and 11b are connected to input terminals of a differential amplifier each by way of a capacitor, an amplifier, a filter and an envelope detect circuit though none of them are shown so that a position (displacement) signal may be obtained at an output of the differential amplifier as servo control information. The output of the differential amplifier is coupled to a differential circuit which produces a velocity signal and also to a zero cross comparator which produces a track passing signal. The velocity signal and the track passing signal serve as servo control information. Those signals are supplied to the servo control circuit 3 (FIG. 1) in order to achieve, in response to the velocity signal and the track passing signal, a seek operation for moving the magnetic head from a certain track to another track and then to achieve, in response to the position signal, a tracking operation to cause the magnetic head to properly follow the latter track after the movement of the magnetic head. Meanwhile, the magnetic recording and playback head 9 has a pair of terminals 12a and 12b and is here connected to the data recording circuit 6 (FIG. 1).

Referring further to FIG. 3, reference symbol P denotes a track pitch, G a guard band width and W a track width, and in the present embodiment, data tracks are recorded in an equal pitch with an equal track width on a disk face of a magnetic disk 1 using the three magnetic heads as described above.

Now, an initial formatting process for such data tracks will be described with reference to FIGS. 4 to 6.

Figure 4:
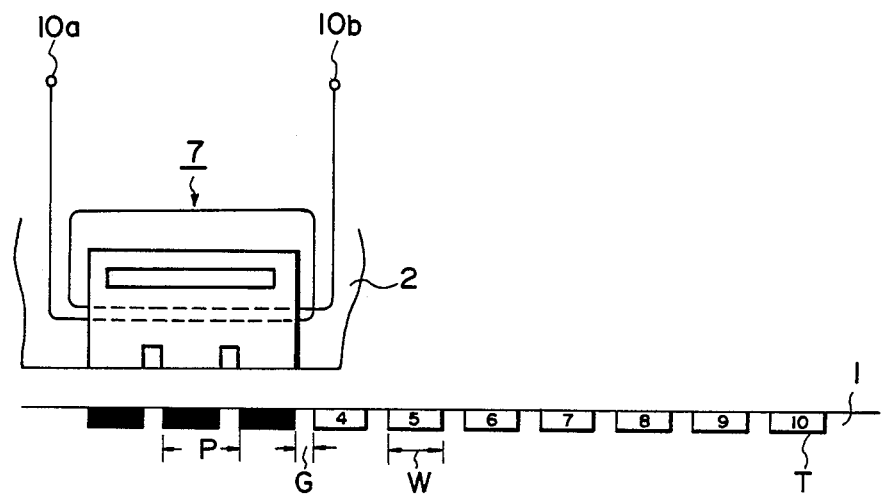
FIGS. 4 to 6 are diagrammatic representations illustrating initial formatting operations.

Referring first to FIG. 4, the head slider 3 is first positioned to a suitable position over the disk face of the magnetic disk 1, for example, around an outer periphery of the magnetic disk 1, by a suitable means (for example, an arm on which the head slider is supported may be abutted against a mechanical stopper without servo controlling the head slider).

Then, a recording signal is supplied from the initial formatting circuit 5 to the magnetic head 7 for initial formatting so that a plurality of data tracks, for example, from the first to the third data tracks T from the outer periphery of the magnetic disk, may be recorded at a time by the magnetic head 7 for initial formatting. The accuracy in dimension of the data tracks T then depends upon the accuracy in dimension of the magnetic head 7 for initial formatting is very high.

Figure 5:
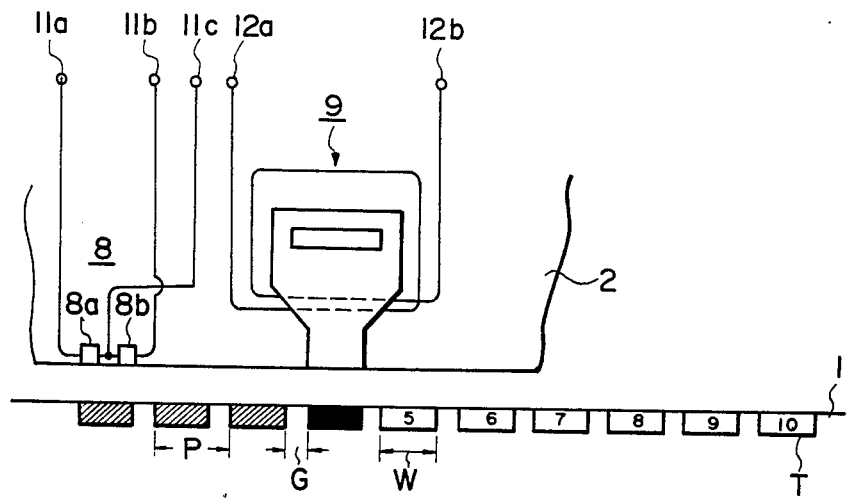
Figure 6:
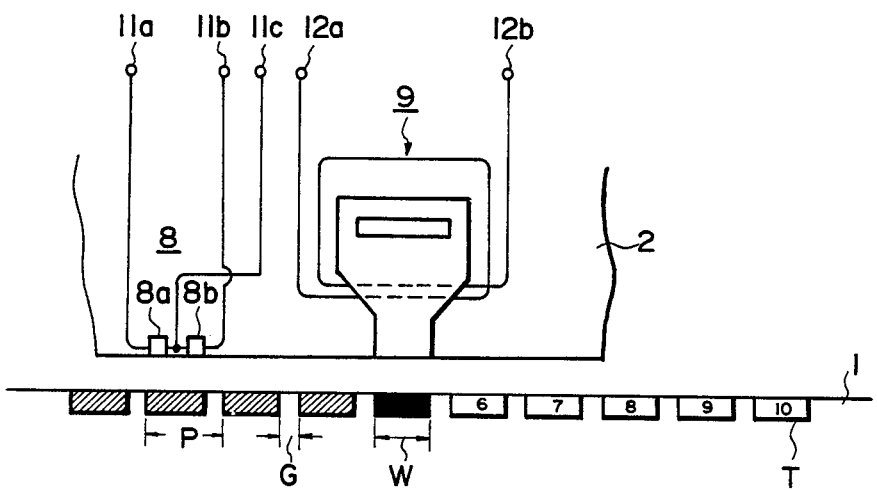

Referring now to FIG. 5, the head slider 2 has been moved by one track pitch in an inward direction of the magnetic disk 1. Then, the first outermost data track T is scanned by the magnetic head 8 for servo control to effect servo control. At the same time, a recording signal is supplied from the data recording circuit 6 to the magnetic recording and playback head 9 to record a fourth data track T from the outer periphery of the magnetic disk 1.

After this, a series of operations are repeated to record data tracks one after another until initial formatting is completed by completion of recording of all required tracks.

Construction of the combination magnetic transducer head apparatus according to the present invention will be described in detail below with reference to FIGS. 7 to 13.

Figure 7:
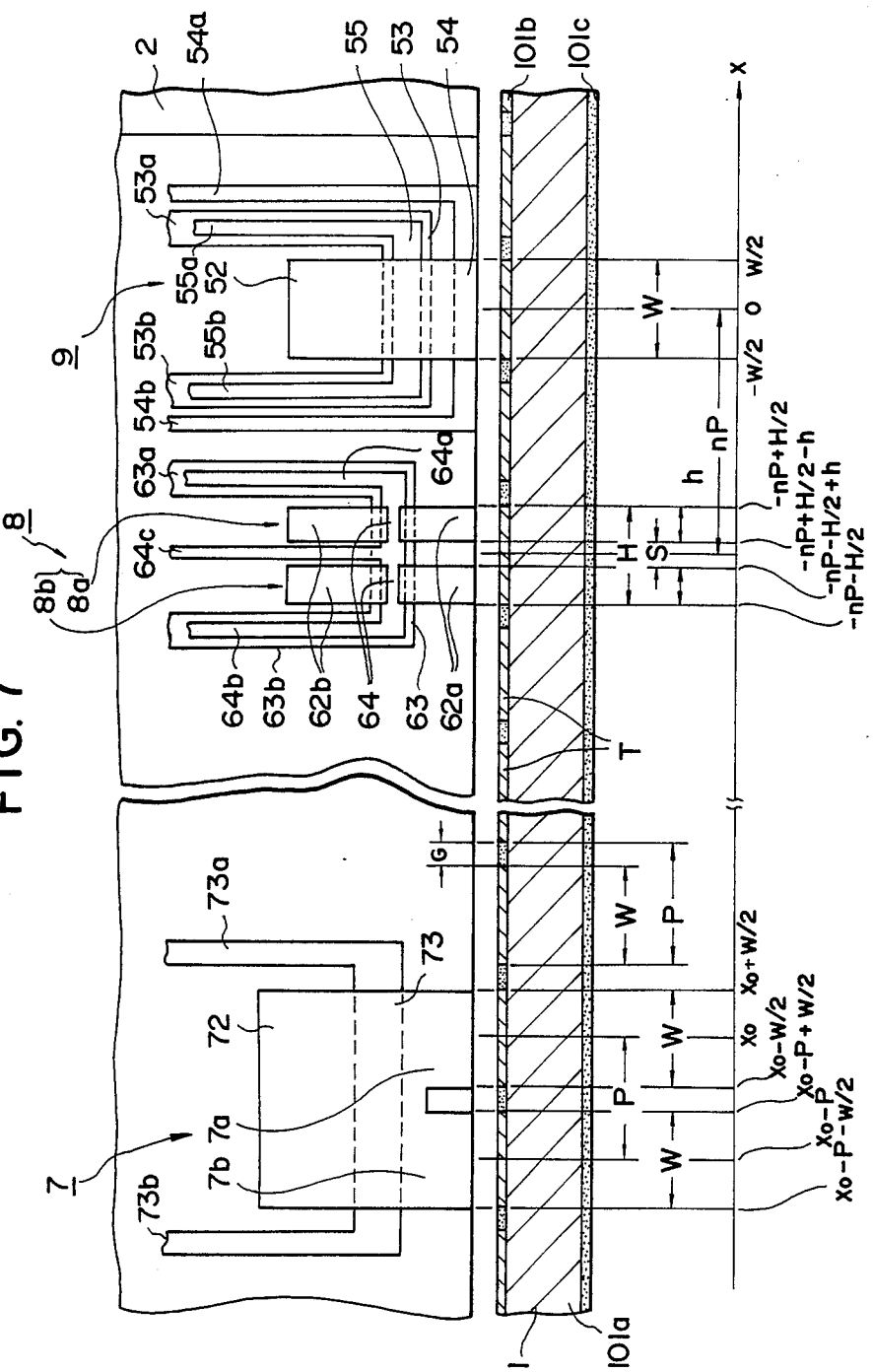
FIGS. 7 to 9 are diagrammatic representations illustrating several examples of constructions of a combination magnetic transducer head apparatus according to the invention.

Referring first to FIG. 7, a hard disk as a rotating magnetic recording medium is designated at 1 and includes a substrate 101a such as of aluminum and a pair of magnetic layers 101b and 101c formed on opposite faces of the substrate 101a. The magnetic layers may each be formed by coating magnetic powder of $\gamma Fe_2O_3$ or the like together with a binder or else may be ferromagnetic metal layers of a ferromagnetic metal such as Fe, Ni or Co or an alloy of them formed using a physical vapour deposition technique such as vacuum deposition or sputtering or using electroplating or electroless plating. Here, only recording on and playback from one of the ferromagnetic layers, that is, the layer 101b, will be described. Reference symbol T denotes a track, and the tracks T are formed in concentrical relationship on the ferromagnetic layer 101b. Further, reference symbol W denotes a width of each track T, P a pitch of the tracks T, and G a guard band width. Accordingly, $P = W + G$.

A magnetic data signal recording and playback head is designated at 9 and is constituted, in the present embodiment, from a thin film type magnetic transducer head which can naturally be replaced by a bulk type magnetic transducer head. The thin film type magnetic head is formed as a combination magnetic transducer head including an electromagnetic induction type magnetic transducer head section for recording and a magnetoresistance effect type magnetic transducer head section for playback.

A servo control head is designated at 8 and includes a pair of magnetic tracking signal playback heads 8a and 8b which have a same trace width and are each constituted, in the present embodiment, from a magnetoresistance effect type thin film magnetic transducer head while it may otherwise be constituted from a bulk type magnetic transducer head or an electromagnetic induction type magnetic transducer head. An initial tracking signal recording magnetic head is denoted at 7 and is constituted, in the present embodiment, from an electromagnetic induction type thin film magnetic transducer head while it may otherwise be constituted from a bulk type magnetic transducer head. The initial tracking signal recording magnetic head 7 has a plurality of, 2 in the present embodiment, divided head sections 7a and 7b which define a magnetic gap therebetween and have cores having a common winding thereon and located in an opposing relationship to a magnetic disk. It is to be noted that the divided head sections may otherwise be formed as independent heads around which coils are wound independently of each other.

While the trace width of the data signal recording and playback magnetic head 9, particularly the trace width upon recording (this is substantially equal to the width of the magnetic gap), is selected to be equal to the width W of tracks T to be recorded or formed, it may be a little different. The trace width of the tracking signal playback magnetic head sections 8a and 8b (this width is substantially equal to the gap width) is represented by h, the distance between the two head sections 8a and 8b is represented by S, and the distance between opposite side edges of each trace of the magnetic heads 8a and 8b is designated by H. In an example of interrelations among those dimensions, H is equal to W, and h and S are equal to G. Accordingly, $H = W = 3G$. For example, G, h and S are 4.5 μm, and W and H are 13.5 μm.

Of the dimensions of the tracking signal playback magnetic head sections 8a and 8b as described above, h must be smaller than G in order to eliminate crosstalk while it is desirable to be greater than G in order to prevent saturation, and H must be greater than W in order that the difference between playback outputs of the magnetic head sections 8a and 8b may be zero when a middle point between the magnetic heads 8a and 8b is just at a middle point of a track T in its widthwise direction but it may assume a different value when the magnetic head sections 8a and 8b are at any other positions, or in other words, in order to prevent appearance of a blind section. It is to be noted that while the crosstalk elimination requirement and the saturation prevention requirement are contradictory upon during production of a magnetic head, the former requirement is considered more serious and thus h is made smaller than or equals to G.

Now, dimensions of the initial tracking signal recording magnetic head 7 will be described. The pitch of the individual head sections 7a and 7b is selected to be equal to the pitch P of the tracks T. The trace width of the head sections 7a and 7b (this is substantially equal to the gap width) is selected to be equal to the width W of the tracks T, but it may be a little different from the latter.

Now, positional relations among the magnetic heads 7, 8a, 8b and 9 will be described. Referring to FIG. 7, the abscissa x indicates a radius of a rotating magnetic recording medium 1 and the value increases toward the outer periphery from the center of the rotating magnetic recording medium 1. In the present embodiment, the data signal recording and playback magnetic head 9 is located adjacent the outer periphery of the rotating magnetic recording medium 1 and the initial tracking signal recording magnetic head 7 is located at an innermost position while the tracking signal playback magnetic heads 8a and 8b are located inbetween. The combination magnetic transducer head including the magnetic heads 7, 8 and 9 is mounted on an end face of the slider 2 as shown in FIG. 2. Referring again to FIG. 2, reference symbols a and b indicate a direction of rotation of the rotating magnetic recording medium 1 and a direction of movement of the slider 2, respectively. It is to be noted that the data signal recording and playback magnetic head 9 is preferably located at an outer position of the rotating magnetic recording medium 1 relative to the initial tracking signal recording magnetic heads 7 in order to record data signals, but an arrangement of the heads 7, 8a, 8b and 9 is not necessarily be so limited and they can be arranged in any order in the direction of the arrangement of the tracks.

Referring back to FIG. 7, positions of the centers and opposite ends of gaps of the individual heads 7, 8a, 8b and 9 are indicated on the abscissa x. Here, the origin of the abscissa x is at the center of the gap of the data signal recording and playback magnetic head 9. The distance in the direction of the arrangement of the tracks between the center of the trace width of the data signal recording and playback magnetic head 9, that is, the origin O, and the center between the traces of the pair of tracking signal playback magnetic heads 8a and 8b, that is, the center between the gaps, is generally represented nP (where n=2, 3, ...), and here n=2 and thus the example where the distance is 2P is shown. The number n of head sections of the initial tracking signal recording magnetic head 7 is determined in accordance with the value n of the distance nP in the direction of the arrangement of the tracks between the center of the trace (the center of the gap) of the data signal recording and playback magnetic head 9 and the center between the traces (the center of the gaps) of the tracking signal playback magnetic heads 8a and 8b, and in this case the number is 2.

As for the initial tracking signal recording magnetic head 7, positions of the center of the gap, that is, the center of the trace width, and both ends of the head section 7b are indicated on the abscissa x with reference to the center $x_O$ of the gap, that is, the center of the trace width, of the head section 7a which is located adjacent the tracking signal playback magnetic head 8b.

Now, operation of the combination magnetic transducer head apparatus according to the present embodiment will be described. When data signals are to be recorded on a rotating magnetic recording medium 1, initially suitable digital signals are supplied to the initial tracking signal recording magnetic head 7 to effect recording to form two reference tracks at an inner circumferential portion of the rotating magnetic recording medium 1 at a time. Then, the same one of the reference tracks of the rotating magnetic recording medium 1 is reproduced at a time by means of the tracking signal playback magnetic heads 8a and 8b, and the positions of the individual magnetic heads are controlled such that the difference between playback outputs thereof may be reduced to zero, and at the same time data signals are recorded by means of the data signal recording and playback magnetic head 9. After this, the tracks recorded by the data signal recording and playback magnetic head 9 are reproduced in a similar manner by the tracking signal playback magnetic heads 8a and 8b while at the same time data signals are recorded by the data signal recording and playback magnetic head 9.

On the other hand, upon reproduction, while tracking is achieved by means of the tracking signal playback magnetic heads 8a and 8b, data signals of a selected track are reproduced by the data signal recording and playback magnetic head 9.

Playback signals reproduced from the tracking signal playback magnetic heads 8a and 8b are supplied to respective envelope detector circuits by way of respective amplifiers and filters not shown, and the outputs of the detected signals of the envelope detect circuits are supplied to a differential amplifier. The output of the differential amplifier is a tracking error signal when tracks are scanned, but is a signal which indicates the position of a rotating magnetic recording medium 1 in its radial direction when the magnetic heads move transversely across tracks. During scanning of the tracks, the positions of the magnetic heads 7, 8a, 8b and 9 in a radial direction of a rotating magnetic recording medium are controlled in response to such a tracking error signal. The differential output of the differential amplifier is supplied to a differential circuit and a zero crossing detector. Output of the differential circuit is a signal which indicates a scanning velocity of the magnetic heads when they move transversely across tracks. Output of the zero crossing detector is a signal which indicates a numerical value corresponding to the number of those tracks which are passed by the magnetic heads when the latter move transversely across tracks.

It is to be noted that when tracking of the data signal recording and playback magnetic head 9 is achieved just upon a track T, the center between the traces of the tracking signal playback magnetic heads 8a and 8b is positioned at the center of the width of the track T.

Figure 9:
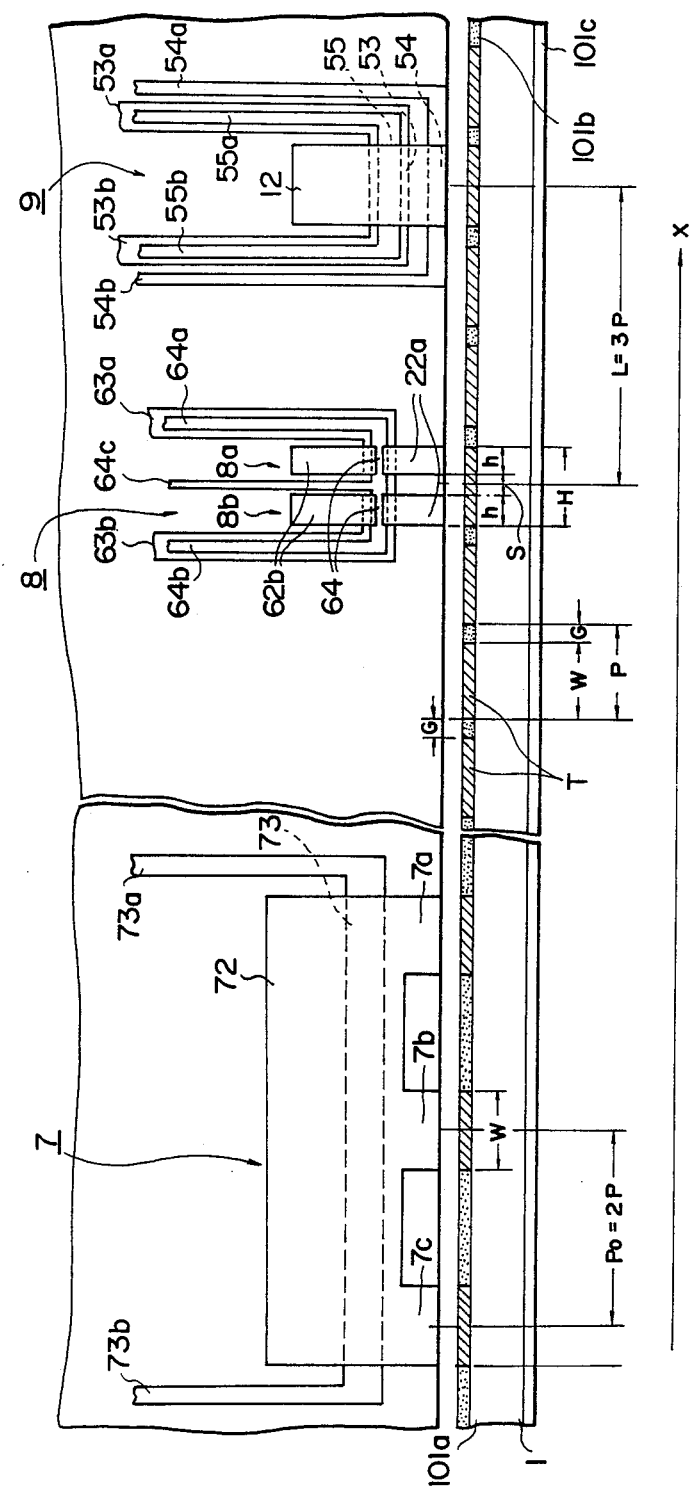

Now, the structure of the individual magnetic heads described above will be described with reference to FIGS. 7 and 11 to 13. Referring first to FIG. 9, the structure of the data signal recording and playback magnetic head 9 is shown. The data signal recording and playback magnetic head 9 is constituted from a combination thin film type magnetic transducer head including an electromagnetic induction type magnetic transducer head section and a magnetoresistance effect type magnetic transducer head section as described hereinabove. In particular, various elements as hereinafter described are formed on a mangetic substrate 51 by way of a nonmagnetic insulating layer such as of $SiO_2$ not shown. At first, a magnetoresistance effect sensing portion 54 is formed above the magnetic substrate 51 with a gap g left therebetween, and a magnetic layer 56 is formed in a magnetically coupled relationship above the magnetoresistance effect sensing portion 54. The magnetic layer 56 is magnetically directly coupled to a magnetic yoke 52 described below. A pair of conductive layers 53 and 55 are disposed above and below the magnetic layer 56, respectively. The magnetic yoke 52 is disposed above the magnetoresistance effect sensing portion 54, the magnetic layer 56 and the conductive layer 55, and has one end thereof magnetically directly coupled to the magnetic substrate 51 and the other end thereof located adjacent the gap g.

Upon reproduction, the magnetic head 9 acts as an magnetoresistance effect type magnetic transducer head, and the conductive layers 53 and 55 are energized with DC currents flowing in mutually opposite directions as perpendicular to the face of the drawing to provide the magnetoresistance effect sensing portion 54 with a bias magnetic field to raise the sensitivity of the latter when data signals are reproduced. On the other hand, upon recording, the magnetic head 9 acts as an electromagnetic induction type magnetic head, and the conductive layers 53 and 55 are energized with recording currents flowing in the same direction perpendicular to the face of the drawing. In this case, the magnetic layer 56 should be passed by very little magnetic fluxes. It is to be mentioned here that in FIG. 7, reference symbols 54a and 54b denote each a connecting conductive layer led out from the magnetoresistance effect sensing portion 54, 55a and 55b each are a connecting conductive layer led out from the conductive layer 55, and 53a and 53b each are a connecting conductive layer led out from the conductive layer 53.

The structure of the tracking signal playback magnetic head sections 8a and 8b will be described below with reference to FIGS. 7 and 12. The tracking signal playback magnetic head sections 8a and 8b are each constituted from a magnetoresistance effect type thin film magnetic transducer head. Several elements are formed on a magnetic substrate 61 which has a nonmagnetic insulating layer such as of $SiO_2$. A yoke is formed on the magnetic substrate 61 and includes two yoke sections 62a and 62b disposed in a spaced relationship by a predetermined distance from each other. A gap g is defined between one end of the yoke section 62a and one end of the magnetic substrate 61. A magnetoresistance effect sensing portion 64 and a bias conductive layer 63 below are disposed between the magnetic yoke sections 62a and 62b and the magnetic substrate 61. Thus, a bias magnetic field is provided to the magnetoresistance effect sensing portion 64 so that the sensitivity of the magnetic head sections 8a and 8b may be raised by energizing the bias conductive layer 63 with a DC current. It is to be mentioned that in FIG. 7, reference numerals 64a, 64b and 64c denote connecting conductive layers led out from opposite ends of the magnetoresistance effect sensing portions 64 of the magnetic head sections 8a and 8b, and 63a and 63b denote connecting conductive layers led out from opposite ends of the bias conductive layer 63.

Now, construction of the initial tracking signal recording magnetic head 7 will be described with reference to FIGS. 7 and 13. The initial tracking signal recording magnetic head 7 is formed, in the present embodiment, from an electromagnetic induction type thin film magnetic head as described hereinabove. Several elements are formed on a magnetic substrate 71 using a nonmagnetic insulating layer such as of $SiO_2$. A yoke 72 is formed on the magnetic substrate 71 and has one end thereof magnetically directly coupled to the magnetic substrate 71. A gap g is defined between the other channel-shaped end of the yoke 72 and one end of the magnetic substrate 71. A conductive layer 73 is located between the yoke 72 and the magnetic substrate 71. Thus, tracking signals can be recorded by energizing the conductive layer 73 with an electric current of recording tracking signals (digital signals). It is to be mentioned that in FIG. 7, reference symbols 73a and 73b are connecting conductive layers led out from opposite ends of the conductive layer 73.

Figure 8:
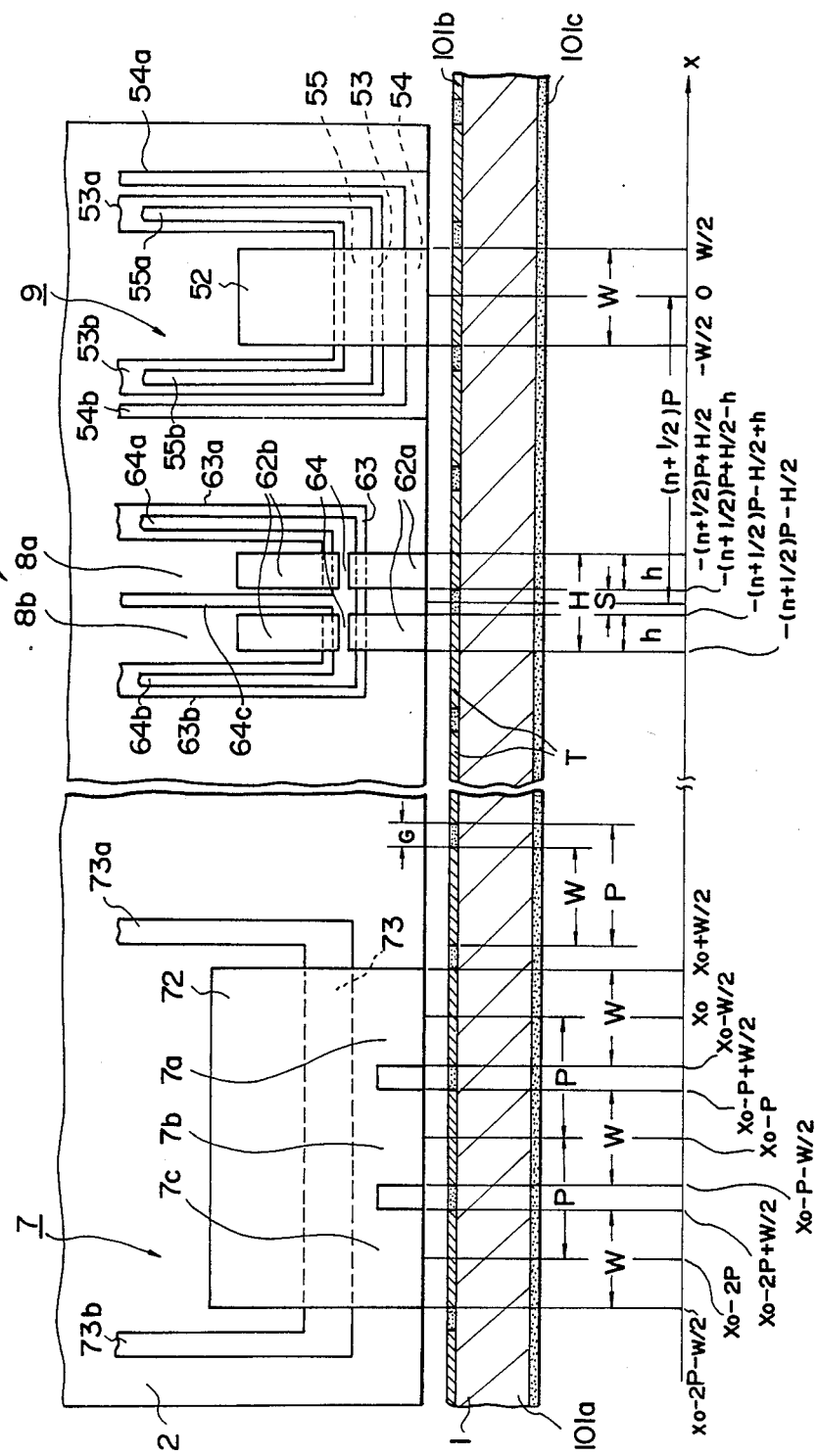

Another embodiment of a combination magnetic transducer head apparatus according to the present invention will now be described with reference to FIG. 8. In FIG. 8, like parts or elements are denoted by like reference symbols as those in FIG. 7, and the description thereof will be omitted herein. The combination magnetic transducer head apparatus of FIG. 8 also includes a data signal recording and playback magnetic head 9, a pair of tracking signal playback magnetic heads 8a and 8b and a magnetic head 7 for initial formatting. The trace width of each of the magnetic heads is selected in a similar manner to that of the embodiment of FIG. 7. In the arrangement of FIG. 8, the tracking signal playback magnetic heads 8a and 8b are disposed to trace end portions of two adjacent recording tracks to produce tracking signals.

In FIG. 8, positions of the centers and opposite ends of gaps of the magnetic heads 7, 8 and 9 are indicated on the abscissa x. In this case, the origin of the abscissa x is at the center of the gap of the data signal recording and playback magnetic head 9. The distance in the direction of the arrangement of tracks between the center of the trace width of the data signal recording and playback magnetic head 9, that is, the origin O, and the center between the traces of the pair of tracking signal playback magnetic heads 8a and 8b, that is, the center between the gaps, is generally represented $(n+\frac{1}{2})P$ (where $n=1, 2, 3, \ldots$), and here $n=2$ and thus the example where the distance is $(5/2)P$ is shown. The quantity or number $n+1$ of head sections of the initial tracking signal recording magnetic head 7 is determined in accordance with the value n of the distance $(n+\frac{1}{2})P$ in the direction of the arrangement of the tracks between the center of the trace (the center of the gap) of the data signal recording and playback magnetic head 9 and the center between the traces (the center of the gaps) of the tracking signal playback magnetic heads 8a and 8b, and in this case the number is 3.

As for the initial tracking signal recording magnetic head 7, positions of the center of the gap, that is, the center of the trace width, and both ends of the head sections 7b and 7c are indicated on the abscissa x with reference to the center $x_O$ of the gap, that is, the center of the trace width, of the head section 7a which is located adjacent the tracking signal playback magnetic head 8b.

Now, operation of the combination magnetic transducer head apparatus according to the present embodiment will be described. When data signals are to be recorded on a rotating magnetic recording medium 1, at first suitable digital signals are supplied to the initial tracking signal recording magnetic head 7 to effect recording to form three reference tracks at an inner circumferential portion of the rotating magnetic recording medium 1 at the same time. Then, the inner two of the reference tracks of the rotating magnetic recording medium 1 are reproduced at the same time by means of the tracking signal playback magnetic heads 8a and 8b, and the positions of the individual magnetic heads are controlled such that the difference between the playback outputs thereof may be reduced to zero, and at the same time data signals are recorded by means of the data signal recording and playback magnetic head 9. After this, the tracks recorded by the data signal recording and playback magnetic head 9 are reproduced in a similar manner by the tracking signal playback magnetic heads 8a and 8b while at the same time data signals are recorded by the data signal recording and playback magnetic head 9.

On the other hand, upon reproduction, while tracking is achieved by means of the tracking signal playback magnetic heads 8a and 8b, data signals of a selected track are reproduced by the data signal recording and playback magnetic head 9.

Outputs of the tracking signal playback magnetic heads 8a and 8b are used to produce, in a manner similar to that in the arrangement of FIG. 7, a tracking error signal, a velocity signal when the magnetic heads move transversely across tracks, and a servo control signal for recording or reproducing a desired track by a signal processing such as counting for jumping over of a number of tracks.

It is to be noted that when tracking of the data signal recording and playback magnetic head 9 is achieved just upon a track T, the center between the traces of the tracking signal playback magnetic heads 8a and 8b is positioned at the center of the width of the track T.

Figure 11:
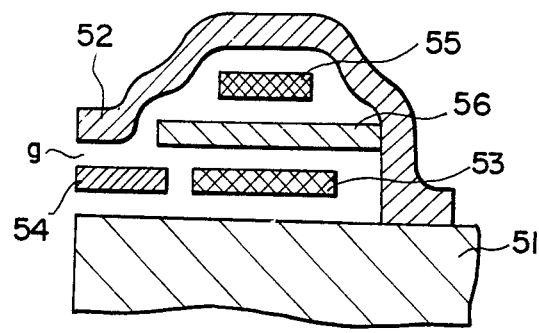
FIGS. 11 to 13 are cross sectional views illustrating different exemplary magnetic heads for use with a combination magnetic transducer head apparatus according to the invention.
Figure 12:
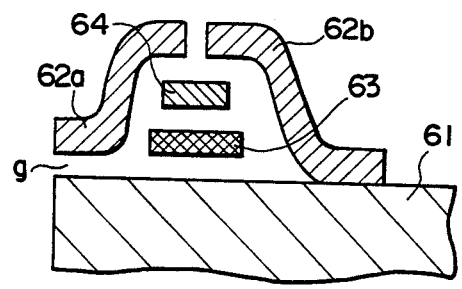
Figure 13:
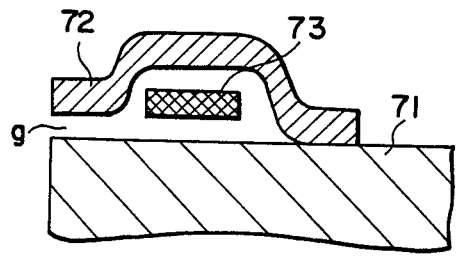

Further, the individual magnetic heads may be any of the heads shown in FIGS. 11 to 13.

Now, a further embodiment of a combination magnetic transducer head apparatus according to the present invention will be described with reference to FIGS. 9 and 10.

At first, dimensions of an initial tracking signal recording magnetic head 7 will be described. The pitch $P_O$ of head sections 7a, 7b and 7c of the magnetic head 7 is selected to be twice of the pitch of tracks T, that is, equal to 2P. The trace width of the head sections 7a, 7b and 7c is selected to be equal to the width W of each track T, but it may be a little different.

Meanwhile, the distance L in a direction of an arrangement of the tracks between the center of the trace width of the data signal recording and the playback magnetic head 9 and the center between the traces, that is, the center between gaps, of a pair of tracking signal playback magnetic heads 8a and 8b is selected to be three times the pitch P of the tracks T, that is, to be 3P.

Now, the positional relationship of the magnetic heads 9, 8a, 8b and 7 will be described. Referring to FIG. 9, the direction from the center of a rotating magnetic recording medium 1 to the outer periphery thereof corresponds to a direction of the abscissa x indicated by an arrow mark. In the present embodiment, the data signal recording and playback magnetic head 9 is located adjacent the outer periphery of the rotating magnetic recording medium 1 and the initial tracking signal recording magnetic head 7 is located at an innermost position while the tracking signal playback magnetic heads 8a and 8b are located inbetween. The combination magnetic transducer head including the magnetic heads 7, 8 and 9 is mounted on an end face of the slider 2 as shown in FIG. 2.

Now, operation of the combination magnetic transducer head apparatus according to the present embodiment will be described. When data signals are to be recorded on a rotating magnetic recording medium 1, at first suitable digital signals are supplied to the initial tracking signal reocrding magnetic head 7 to effect recording to form two reference tracks at an inner circumferential portion of the rotating magnetic recording medium 1 at the same time. Then, the same ones of the reference tracks of the rotating magnetic recording medium 1 is reproduced at the same time by means of the tracking signal playback magnetic heads 8a and 8b, and the positions of the individual magnetic heads are controlled such that the difference between playback outputs thereof may be reduced to zero, and at the same time data signals are recorded by means of the data signal recording and playback magnetic head 9. After this, a data track formed between the reference tracks and a reference track are alternately reproduced in a similar manner while at the same time data signals are recorded by means of the data signal recording and playback magnetic head 9. Thereafter, data tracks recorded one after another are reproduced in a similar manner while at the same time data signals are recorded by the data signal recording and playback magnetic head 9.

Figure 10:
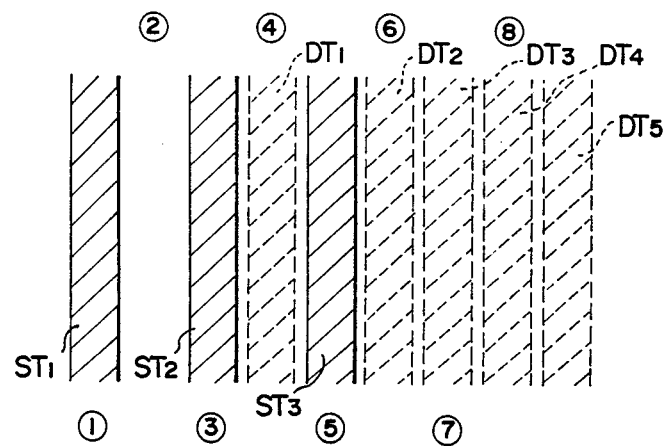
FIG. 10 is a diagrammatic representation illustrating an operation for initial formatting of data tracks by the combination magnetic transducer head apparatus of FIG. 9.

In particular, after reference tracks ST1, ST2 and ST3 have been recorded at track positions 1, 3 and 5 as shown in FIG. 10 by the initial tracking signal recording magnetic head 7, while the reference tracks ST1, ST2 and ST3 are being tracked by the tracking signal playback magnetic head 8, data tracks DT1 and DT2 are recorded, that is, the data track DT1 is formed with reference to the reference track ST1 at the position 1 and the data track DT2 is formed at a position 6 with reference to the reference track ST2 at the position 3. After then, data tracks DT3, DT4, DT5 . . . are formed one after another while the data track DT1 at the position 4, the reference track ST3 at the position 5, the data track DT3 at the position 6 . . . are tracked one after another.

On the other hand, upon reproduction, data signals of a desired track are reproduced by the data signal recording and playback magnetic head 9 while tracking is achieved by the tracking signal playback magnetic heads 8a and 8b.

In the initial tracking signal recording magnetic head 7 according to the present embodiment, gaps of the head sections 7a, 7b and 7c and clearances between adjacent ones thereof are formed with accurate dimensions particularly because the pitch of the head sections 7a, 7b and 7c of the magnetic head 7 is $P_O$ which is equal to twice of the pitch P of tracks to be formed by magnetic recording (thus, $P_O=2P$). Accordingly, recording of good initial tracking signals is achieved with an accurate width of tracks and also with an accurate distance between adjacent tracks.

As apparent from the foregoing description, according to the present invention, a magnetic head for initial formatting is located on a head slider together with a magnetic head for servo control and a magnetic recording and reproducing head. Accordingly, initial formatting can be achieved by a magnetic disk system itself without using a specific initial formatting system, and hence construction can be simplified and a cost therefor can be reduced.

In addition, since initial formatting can be achieved by a magnetic disk system itself and, no deterioration in accuracy of a positioning servo control mechanism will occur due to initialization by a separate initial formatting system as in a conventional technique.

What is claimed is:

1. A combination magnetic transducer head apparatus, comprising:
   a slider disposed in an opposing relationship to a rotating magnetic recording medium and mounted for movement in a radial direction of the rotating magnetic recording medium; and a data signal recording and playback magnetic head mounted on said slider, a pair of tracking signal playback magnetic heads mounted on said slider and having the same trace width, and an initial tracking signal recording magnetic head mounted on said slider and having three or more head sections;

whereby, where the pitch of tracks to be formed on the rotating magnetic recording medium is P, the pitch of said plurality of head sections of said initial tracking signal recording magnetic head in a direction of the arrangement of the tracks is selected to be equal to twice of the pitch P of the tracks while the distance in the direction of the arrangement of the tracks between the center of the trace width of said data signal recording and playback magnetic head and the center between the traces of said pair of tracking signal playback magnetic heads is selected to be 3P.

2. A combination magnetic transducer head according to claim 1 wherein the trace width of each head section of said initial tracking signal recording magnetic head being equal to the width W of each track T.

* * * * *